US012088872B2

(12) United States Patent
Chan et al.

(10) Patent No.: US 12,088,872 B2
(45) Date of Patent: Sep. 10, 2024

(54) INTEGRATED CIRCUITRY OF SPEAKER (71) Applicant: REALTEK SEMICONDUCTOR CORP., Hsinchu (TW)

(72) Inventors: Chun-Chieh Chan, Hsinchu (TW); Hung-Shao Chen, Hsinchu (TW); Chia-Hao Chang, Hsinchu (TW); Tzu-Hsin Fan, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 147 days.

(21) Appl. No.: 17/729,246

(22) Filed: Apr. 26, 2022

(65) Prior Publication Data

US 2023/0082685 A1 Mar. 16, 2023

(30) Foreign Application Priority Data

Sep. 13, 2021 (TW) .................. 110133935

(51) Int. Cl.
*H04N 21/4363* (2011.01)
*H04N 21/438* (2011.01)
*H04N 21/439* (2011.01)
*H04N 21/4402* (2011.01)

(52) U.S. Cl.
CPC ..... *H04N 21/43635* (2013.01); *H04N 21/438* (2013.01); *H04N 21/4394* (2013.01); *H04N 21/4398* (2013.01); *H04N 21/4402* (2013.01)

(58) Field of Classification Search
CPC ........... H04N 21/43635; H04N 21/438; H04N 21/4398; H04N 21/4402; H04N 21/2335; H04N 21/4394
See application file for complete search history.

(56) References Cited

U.S. PATENT DOCUMENTS

| 10,771,840 | B2* | 9/2020 | Moriie | H04N 21/4516 |
| 11,159,785 | B1* | 10/2021 | Lin | H04N 7/035 |
| 2012/0188456 | A1* | 7/2012 | Kuroyanagi | H04N 5/765 348/731 |
| 2018/0247671 | A1* | 8/2018 | Ichimura | H04N 5/765 |
| 2020/0351465 | A1* | 11/2020 | Wolff | H04R 3/00 |
| 2021/0098011 | A1 | 4/2021 | George et al. | |

(Continued)

OTHER PUBLICATIONS

Chun-Chieh Chan, et al. "Video Processing Method and Video Processor," U.S. Appl. No. 17/474,132, filed Sep. 14, 2021.

*Primary Examiner* — Pinkal R Chokshi
(74) *Attorney, Agent, or Firm* — Li & Cai Intellectual Property (USA) Office (57) ABSTRACT

A multimedia system and a protocol converter are provided. The multimedia system includes a sink device, e.g., a television, various audiovisual devices connected to the sink device, and the protocol converter. The protocol converter is connected to the sink device, and processes the audio and video signals inputted from a specific audiovisual source and outputted to the sink device to be played. The audio signals can be processed and played by an audio playback device directly connected with the protocol converter. Furthermore, the protocol converter can process the audio signals being returned from the sink device of the multimedia system via an audio return channel or an enhanced audio return channel. Finally, the received audio signals are converted and outputted to one of various audio output interfaces supported by the protocol converter.

11 Claims, 6 Drawing Sheets (56) References Cited

U.S. PATENT DOCUMENTS

2021/0099278 A1*  4/2021  Jean ..................... H04L 65/765
2021/0185291 A1   6/2021  Chan et al.
2022/0179815 A1*  6/2022  Carino ................ G06F 13/4022

* cited by examiner

INTEGRATED CIRCUITRY OF SPEAKER

CROSS-REFERENCE TO RELATED PATENT APPLICATION

This application claims the benefit of priority to Taiwan Patent Application No. 110133935, filed on Sep. 13, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to an audiovisual system, and more particularly to a multimedia system that adopts a protocol converter that supports an audio return channel.

BACKGROUND OF THE DISCLOSURE

With rapid development of the multimedia industry, requirements on audiovisual quality are gradually increased. Most of the modern audiovisual devices support multiple transmission interfaces for transmitting specific formats of audiovisual signals. The transmission interface is such as a DisplayPort (DP), a high-definition multimedia interface (HDMI) or a Wi-Fi® interface. The audiovisual device can support various high quality video formats such as 4K, 5K or 8K that allow a user to experience higher viewing quality. In terms of the audio, the user can also experience higher listening quality since more audio formats and audio coding technologies are available to public.

Figure 1:
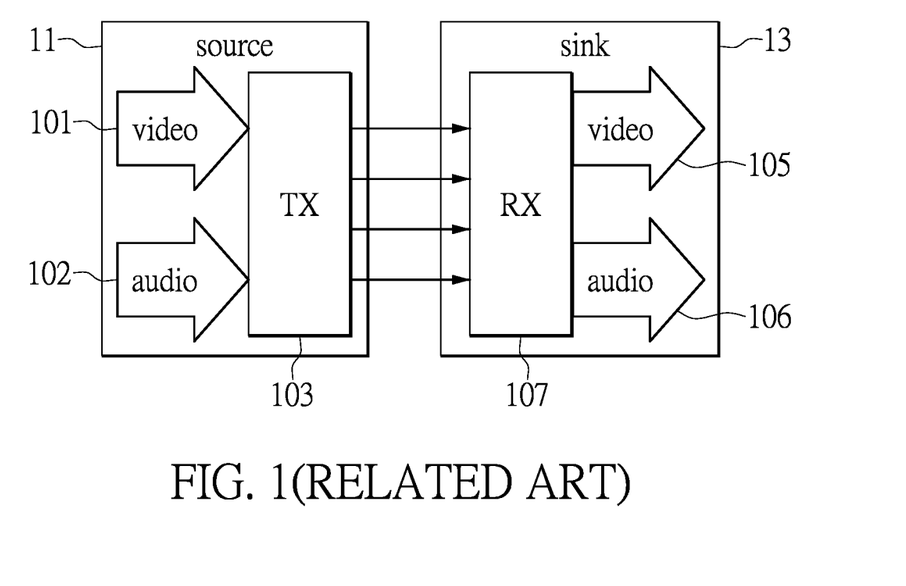
FIG. 1 is a functional block diagram of a high-definition multimedia interface (HDMI) protocol.

With HDMI as an example, reference is made to FIG. 1 that shows a block diagram depicting an HDMI protocol in an HDMI audiovisual system. The HDMI protocol is defined to have a source 11 and a sink 13. The source 11 implements an HDMI source device of an audiovisual system. The sink 13 implements an HDMI sink device of the audiovisual system. The source device can be a device in the audiovisual system used to receive external audiovisual signals. The source device is such as a set-top box, a DVD player or a game console. The sink device can be a device in the audiovisual system used to play the video when receiving audiovisual signals. The sink device can be a television and a speaker.

In the source 11, a transmitter (TX) 103 receives signals of a video 101 and an audio 102 from an audiovisual source, converts the signals into audiovisual signals in compliance with an HDMI protocol, and then transmits the audiovisual signals to a receiver (RX) 107 of the sink 13 via multiple channels over a cable or a wireless connection. Under the HDMI protocol, signals of a display data channel (DDC) and a consumer electronics control (CEC) that regulated the transmission of various signals are also transmitted. The signals are then converted and decoded into audiovisual signals that are broadcasted. The audiovisual signals can be separated into the video 105 and the audio 106 shown in the diagram.

However, nowadays the increasingly more complex multimedia applications may be mixed with various audio and video transmission protocols. A conventional technology such as a protocol converter (PCON) has been developed for audiovisual environments with various audio and video interfaces. One of the objectives of the protocol converter is to convert an input audiovisual transmission format of the audiovisual signals and then output the audiovisual signals. The protocol converter allows different transmission interfaces at both the source end and the sink end to be compatible and allows a user to flexibly use transmitters with different transmission interfaces at the sink device, e.g., a television. The protocol converter successfully extends the scope and functions of multimedia applications.

In addition, for enhancing and improving audio applications under the HDMI protocol, an HDMI supported device can return audio signals from the sink end (HDMI RX) to the source end (HDMI TX) through an audio return channel (ARC) or an enhanced audio return channel (eARC) technology. Therefore, the HDMI supported device can flexibly transmit the audio signals via a multimedia platform.

The protocol converter allows the devices at the source end and the sink end with different audio and video interfaces to transmit audiovisual signals with each other. For example, a DP-to-HDMI protocol converter receives DP signals from a DP/Type-C source end, and converts the DP signals into signals that have HDMI transmission format, and transmits the audiovisual signals to a sink device via an HDMI transmitter (TX).

In addition to audiovisual transmission format conversion, an HDMI multimedia platform framework uses the sink device as a root between the DP and the HDMI device, and uses various HDMI devices connected to the sink device as branches. A CEC mechanism under the HDMI protocol utilizes a CEC pin in an HDMI port to transmit bidirectional control signals via a single wire. The CEC mechanism allows the user to use a remote control to control all the HDMI devices connected to the sink device and enables the HDMI devices to be interactive and controlled cooperatively. However, the DP transmission interface does not support the CEC mechanism and the protocol converter therefore requires CEC over aux (auxiliary) technology that rewrites CEC control signals received by the HDMI receiver (RX) to a DisplayPort configuration data (DPCD) of the DP protocol. The CEC control signals are forwarded to the DP/Type-C source end via an auxiliary line of DP. Therefore, DP/Type-C source device is added to the HDMI multimedia platform framework.

Figure 2:
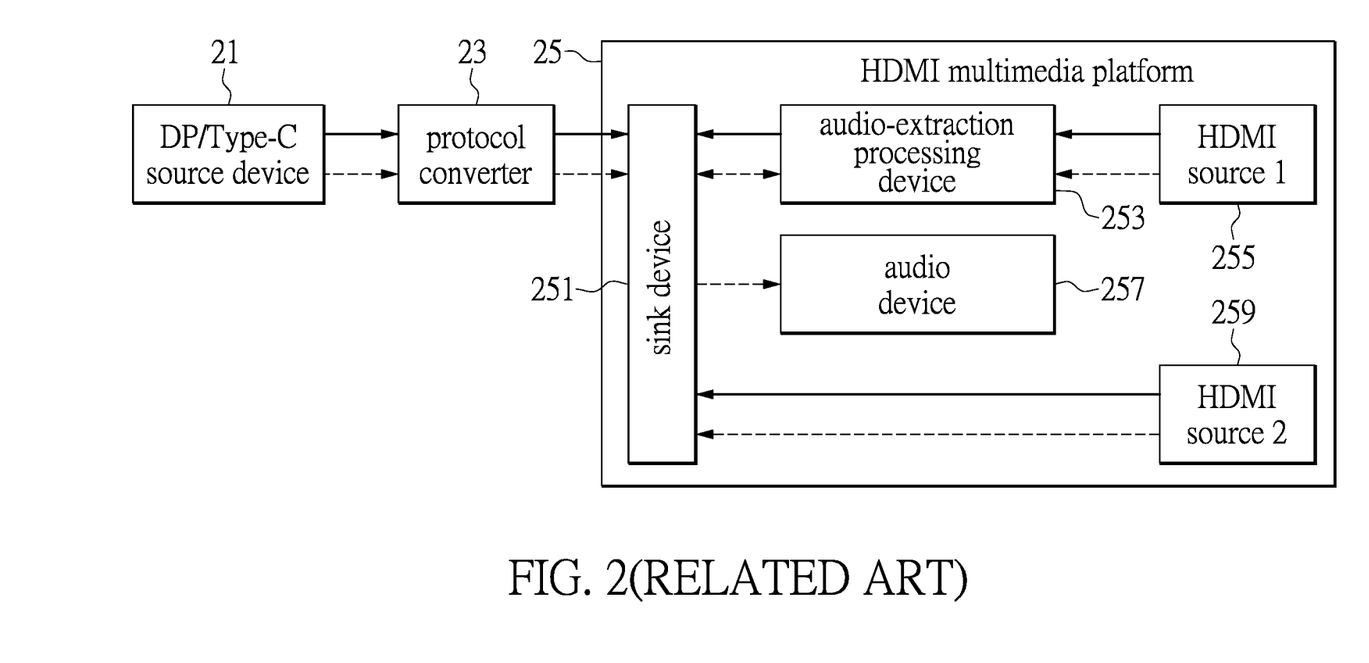
FIG. 2 is a schematic diagram depicting a conventional technology that integrates a DP/Type-C source device to an HDMI multimedia platform.

FIG. 2 is a schematic diagram depicting a conventional framework of the multimedia system. A DP/Type-C source device 21 connects to an HDMI multimedia platform 25 via a protocol converter 23. The HDMI multimedia platform 25 acts as a sink end of the system framework. The solid lines shown in the diagram indicate video signals, and the broken lines indicate audio signals. The HDMI multimedia platform 25 includes a sink device 251 (e.g., a television) that receives the HDMI protocol video signals and the audio signals from the protocol converter 23. The sink device 251 also receives audio and video content from other devices in the HDMI multimedia platform 25. For example, the sink device 251 receives audio signals from an audio-extraction processing device 253 at a first HDMI source (255); in the meantime, the audio signals can be returned to the audio-extraction processing device 253 via the audio return channel (ARC/eARC). Further, the sink device 251 also directly receives audio and video content from a second HDMI source (259). The sink device 251 can output the audio signals to an external audio device 257.

Nevertheless, the above-mentioned conventional protocol converter (PCON) still has some limitations such that the HDMI transmitter (TX) of the protocol converter can only output audiovisual signals but cannot support the ARC/eARC function under the HDMI protocol. Thus, an HDMI sink device can return audio signals to HDMI transmitter via a utility pin and a hot-plug detect (HPD) pin of the HDMI port, such that the HDMI sink device cannot receive audio signals from the HDMI sink device, which is equivalent to sacrificing an audio signal source of the protocol converter.

Furthermore, the protocol converter focuses on conversion among different audio and video interfaces. FIG. 2 shows an exemplary protocol converter 23 that analyzes audio signals in the DP signals, and converts the signals to the audio packets under the HDMI transmission protocol. The audio signals are then transmitted to the sink device 251 that is the HDMI sink device. The conventional protocol converter 23 does not perform additional encoding format conversion or processing on the audio signals in the audio packets. Further, the signals analyzed from the DP signals can only be transmitted to the HDMI sink device in a single direction without any other option of outputting the audio signals. Therefore, if the user desires a higher quality listening experience, an additional device for processing the audio signals is required to be connected unless the connected HDMI sink device supports ARC/eARC.

To sum up the above reasons, even if the DP/Type-C source device 21 as shown in FIG. 2 can merge part of the video signals to the HDMI multimedia platform, the increased burden on establishment of the HDMI multimedia platform may result in decrease of convenience in use since the audio signals to be transmitted may not be effectively merged with the platform.

SUMMARY OF THE DISCLOSURE

In view of the problem that the conventional protocol converter (PCON) cannot deal with the returned audio signals from a high-definition multimedia interface (HDMI) sink and the audio signals can only be one-way transmitted to the HDMI sink for there is no other options for outputting the audio signals, the present disclosure provides a multimedia system and a protocol converter applied to the multimedia system. In addition to dealing with the audio signals inputted from a specific audiovisual source, the protocol converter can process the audio signals returned from a sink device in the multimedia system. The audio signals are converted to various formats of audio signals to be outputted via various audio transmission interfaces.

According to one embodiment of the present disclosure, the multimedia system mainly includes a sink device and a protocol converter. The protocol converter is connected with the sink device. The protocol converter includes an audiovisual receiver used to receive an audiovisual data. A video portion is transmitted to a video processor for performing decoding/encoding process upon the video portion according to a video format. An audiovisual transmitter then outputs video and audio signals that are processed to the sink device. An audio protocol processing unit provided in the multimedia system can receive an audio portion of the audiovisual data from the audiovisual receiver. The audio portion is processed and converted into audio signals that conform to a specific audio format. The audio signals are then outputted to a corresponding device or to an audio output device that is connected with the protocol converter.

Further, the audio protocol processing unit receives the returned audio signals from the sink device by an audio transceiver. The returned audio signals are then processed and outputted to an audio output device.

The protocol converter receives audio signals from the sink device via an audio return channel (ARC) or an enhanced audio return channel (eARC). In the multimedia system, the sink device is connected with one or more audiovisual devices. The one or more audiovisual devices can be a source of the audiovisual data for the sink device. The one or more audiovisual devices can also generate the audio signals that are outputted to the protocol converter.

Preferably, the audio portion of the audiovisual data received by the protocol converter via the audiovisual receiver is a first formation audio. The first format audio is converted to a second format audio, and the second formation audio is then outputted to the sink device. The protocol converter can also receive the audio signals from the sink device and the audio signals are the second format audio.

Still further, the protocol converter includes at least one audio output interface. An audio output multiplex-switching circuit is used to decide upon one of the audio output interfaces. The audio output interface can be one or more of an analog interface, a digital interface, and a radio-frequency interface.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

For improving the drawbacks of the conventional protocol converter (PCON) that can only output the audiovisual signals, cannot support high-definition multimedia interface (HDMI) based audio return channel or enhanced audio return channel (ARC/eARC), and cannot process the audio signals returned from an HDMI sink device (e.g., a television) but only transmit audio signals to the HDMI sink device, the present disclosure provides a multimedia system and a protocol converter that is capable of processing the audio signals. Through technical improvement of a transmission interface of the protocol converter, the protocol converter is able to collaborate with a sink device of the multimedia system in processing the video and audio signals without any additional external audio processing device for processing the audio signals. This new protocol converter can be operated in the multimedia system that includes the sink device such as a television and an audiovisual player. The system is preferably an HDMI-based multimedia system.

Figure 3:
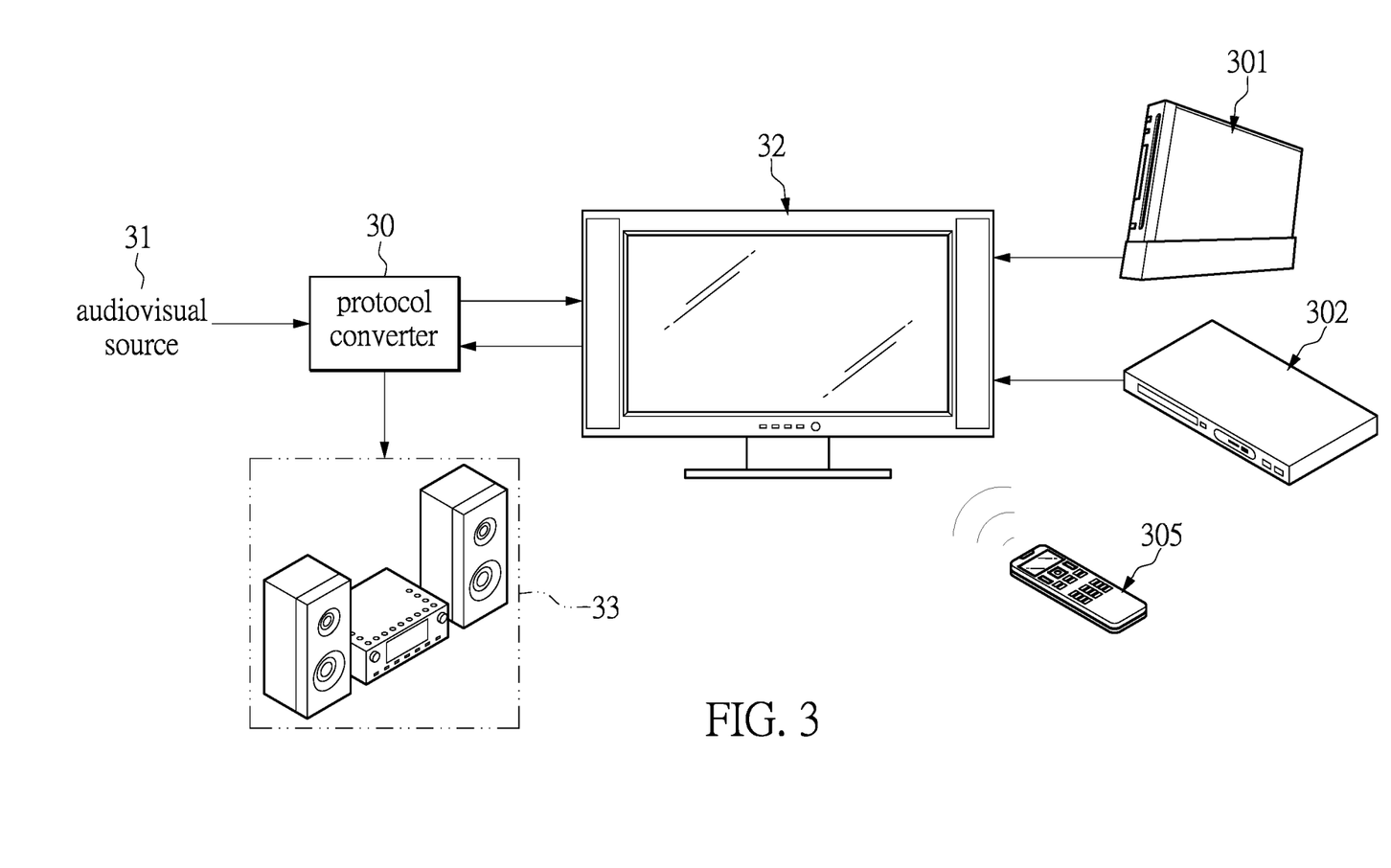
FIG. 3 is a schematic diagram depicting a circumstance in which a multimedia system uses a protocol converter.

FIG. 3 is a schematic diagram depicting a circumstance in which a multimedia system uses a protocol converter.

A multimedia system includes an audiovisual player 32 that can be a television. The audiovisual player 32 acts as a sink device of the multimedia system. The sink device receives audiovisual data transmitted from an audiovisual source 31 through a protocol converter 30. The audiovisual source 31 may conform to a specific format of a transmission interface, e.g., DP/Type-C. The audiovisual data being transmitted via the transmission interface can be converted by the protocol converter 30 into signals conforming to a specific transmission format, e.g., HDMI, supported by the sink device. The audiovisual player 32 at the sink is able to connect with one or more audiovisual devices such as a first audiovisual device 301 and a second audiovisual device 302 of the figures. With a home audiovisual device as an example, as shown in the figures, the first audiovisual device 301 and the second audiovisual device 302 are such as a TV game console and a DVD player. The first audiovisual device 301 and the second audiovisual device 302 act as various audiovisual sources of the multimedia system. The first audiovisual device 301 and the second audiovisual device 302 can also be the audiovisual sources of the sink device.

According to one embodiment of the present disclosure, the audiovisual player 32, the first audiovisual device 301 and the second audiovisual device 302 at the sink support CEC (consumer electronics control) function incorporated in the HDMI specification. The multimedia system that supports an HDMI-CEC function is able to connect with various audiovisual devices that support HDMI specification via a connection in compliance with a specific specification. The connection is implemented by a bidirectional communication cable. Thus, in the multimedia system, the devices that support HDMI-CEC specification at the sink can be controlled by only a remote control 305.

In FIG. 3, under the HDMI-CEC specification, a user manipulates the remote control 305 to operate the audiovisual player 32. Control signals generated by the remote control 305 are transmitted as a remote control pass through command to all devices that connect with the audiovisual player 32. The devices such as the first audiovisual device 301 and the second audiovisual device 302 as shown in the figures receive the control signals. The control signals can also be transmitted to the protocol converter 30 of the multimedia system.

According to the embodiment shown in the diagram, in addition to converting the audiovisual data inputted from the audiovisual source 31 and transmitting the audiovisual data to the audiovisual player 32, the protocol converter 30 is able to process the audio signals returned from the audiovisual player 32 via the audio return channel (ARC) or the enhanced audio return channel (eARC). Further, the audiovisual device of the sink device (i.e., the audiovisual player 32) also generates the audio signals outputted by the sink device to the protocol converter 30. The audio signals inputted to the protocol converter 30 are converted and outputted to an audio system 33 for playback via an output interface.

Figure 4:
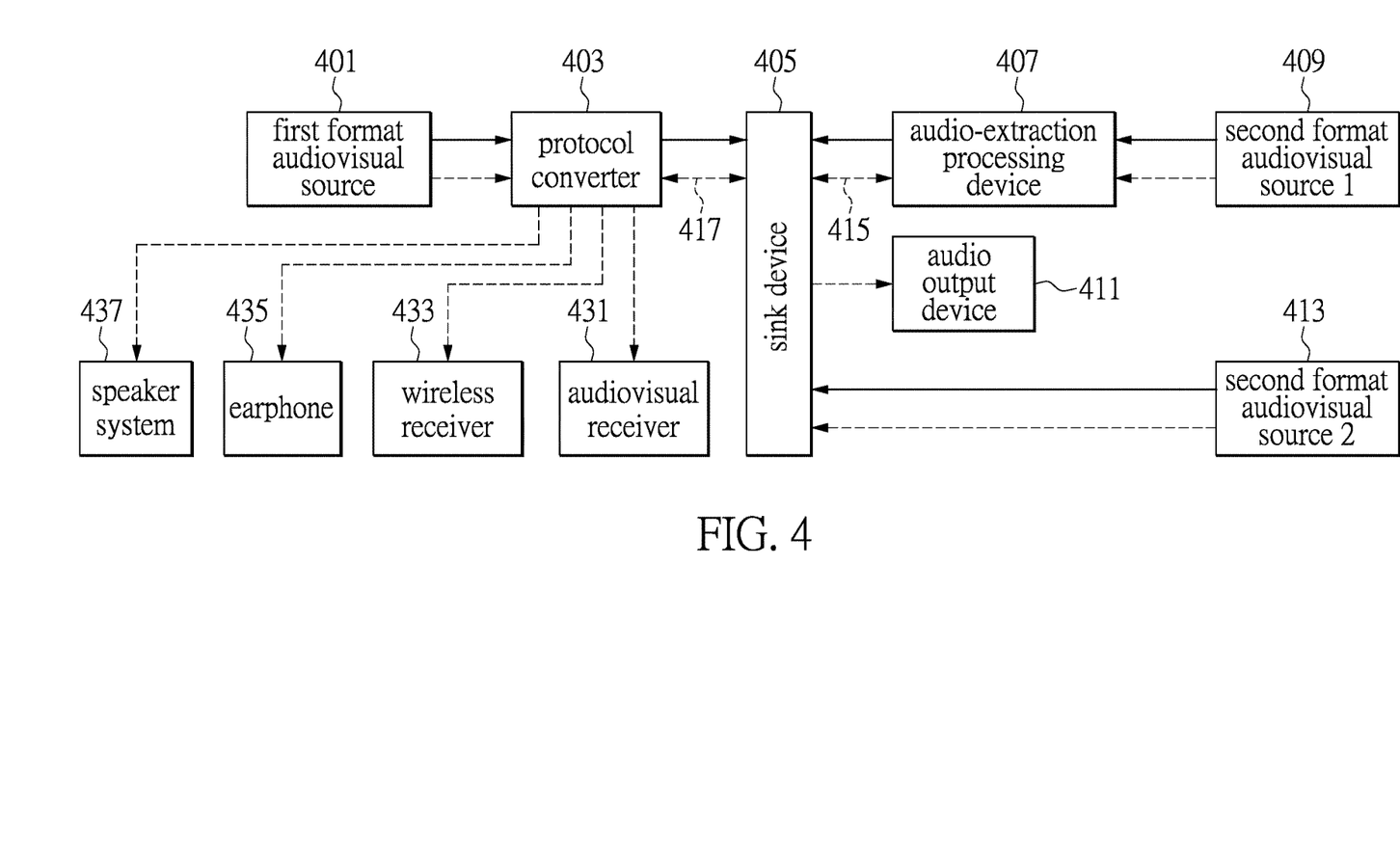
FIG. 4 is a schematic diagram depicting a multimedia system framework according to one embodiment of the present disclosure.

Reference is made to FIG. 4, which is a schematic diagram depicting a framework of the multimedia system according to one embodiment of the present disclosure. The main components of the multimedia system include a protocol converter 403 and a sink device 405. The various audiovisual devices connected with the sink device 405 are such as a second format audiovisual source (1) 409, an audio output device (e.g., an external speaker, an earphone or the like) 411 and a second format audiovisual source (2) 413. The protocol converter 403 is configured to support the audio return channel (ARC) and the enhanced audio return channel (eARC) under the HDMI specification. The protocol converter 403 is able to process the audio signals returned from the sink device 405. In the multimedia system, the protocol converter 403 is able to directly output audio signals to any of the audio output devices. Rather than the audio output device 411 connected with the above-mentioned sink device 405, the audio output device connected with the protocol converter 403 can be an audiovisual receiver (AVR) 431, a wireless receiver 433, an earphone 435, and a speaker system 437.

In an embodiment of the present disclosure, the multimedia system receives a first format audiovisual data from a first format audiovisual source 401. The first format audiovisual data can be the above-mentioned data in compliance with the DP/Type-C transmission format. The first format audiovisual data includes both audio signals and video signals. The protocol converter 403 converts the received audiovisual data to HDMI-based audiovisual data. The HDMI-based audiovisual data is then transmitted to the sink device 405 and to be played by an audiovisual device.

On the other hand, the multimedia system is configured to have multiple different audiovisual sources such as the second format audiovisual source (1) 409. The audio signals can be inputted to the sink device 405 via an HDMI cable or a wireless connection, and the audio signals can also be inputted to the sink device 405 through an audio-extraction processing device 407. The sink device 405 can also be a source for one of the audio signals. The audio signals generated by the sink device 405 can be inputted to the audio-extraction processing device 407 via the audio return channel 415. Further, the second format audiovisual source (2) 413 is connected with the sink device 405 via an HDMI cable or a wireless connection, and the audiovisual data from the second format audiovisual source (2) 413 can be inputted to the sink device 405. The sink device 405 can output the audio signals to the audio output device 411 for playback.

Further, the protocol converter 403 particularly employs the audio return channel or the enhanced audio return channel (ARC/eARC) function to process the audio signals returned from the sink device 405. The protocol converter 403 receives first format audio signals and video signals from the first format audiovisual source 401. The protocol converter 403 then converts the audiovisual signals into the signals in compliance with a second format that is supported by the multimedia system having the sink device 405. The protocol converter 403 can also receive the audio signals returned from the sink device 405 via an audio return channel 417. Thus, the protocol converter 403 performs a decoding/encoding process on the audio signals that are transmitted from the first format audiovisual source 401 or returned from the sink device 405. The protocol converter 403 can convert the audio signals into formats that are supported by various audio transmission interfaces. The audio signals processed by the protocol converter 403 are outputted by one or more audio players in connection with the protocol converter 403. As shown in the diagram, the wired or wireless output devices supported by the protocol converter 403 are such as the audiovisual receiver 431 and the wireless receiver 433. Still further, the audio signals processed by the protocol converter 403 that performs digital-to-analog conversion can also be outputted by the earphone 435 or the speaker system 437.

In one embodiment of the present disclosure, an audio player supported by the protocol converter 403 includes wired interfaces such as I$^2$S (inter-IC sound), S/PDIF (Sony/Philips digital interface) and line-out, and wireless interfaces such as Bluetooth® and Wi-Fi®. Through the protocol converter 403, the multimedia system can more flexibly transmit audio signals of various formats to corresponding audio players for playback.

Further, the protocol converter 403 can also process the audio signals by many post-processing such as volume adjustment, noise cancellation and equalization. The protocol converter 403 can further encode or decode the audio signals. For example, the audio signals received by the protocol converter 403 can be compressed and encoded into audio signals of a specific format such as AC3 (Audio Coding version 3), DTS (Digital Theater Systems), MPEG (Moving Pictures Experts Group) or a type of multi-channel or multi-stream, and the protocol converter 403 is able to directly decode or convert the audio signals to audio signals of any format for further applications.

Therefore, the protocol converter 403 is capable of processing the audio signals directly without by any external or internal audio processing device. The protocol converter 403 can transmit the audio signals to any of the various audio players connected with the protocol converter 403 for playback. The protocol converter 403 can minimize the sound delay and provide the most instantaneous listening experience to the user.

Figure 5:
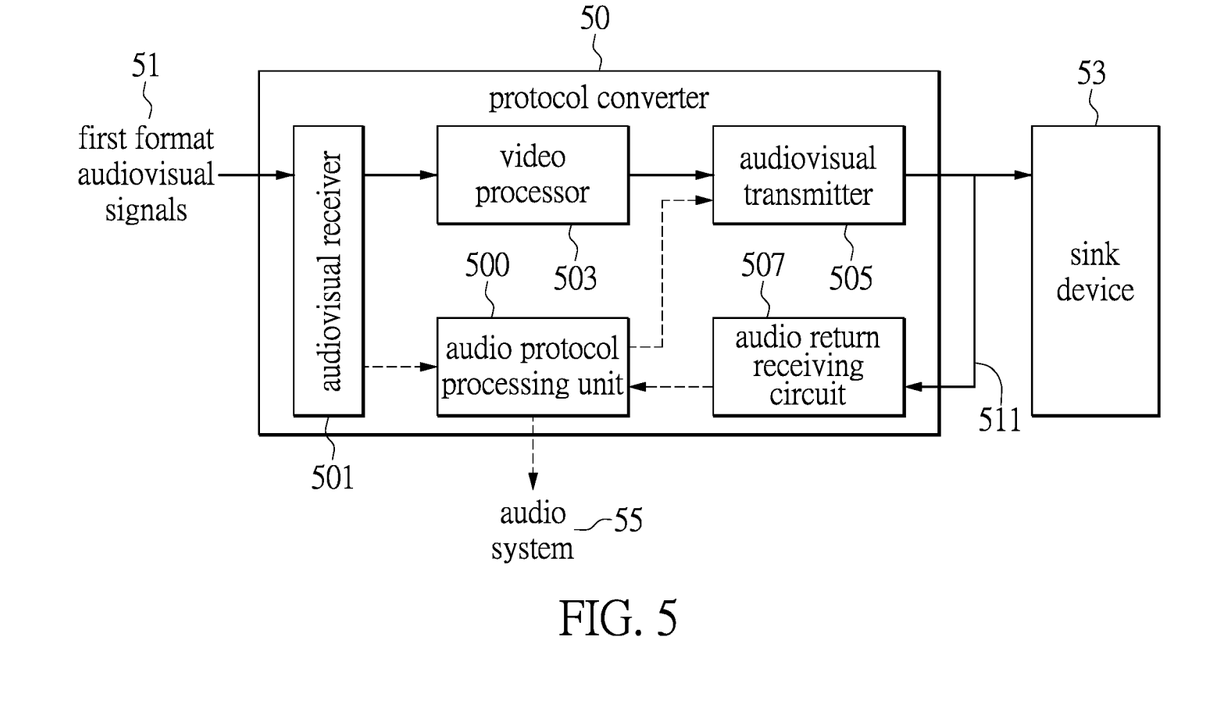
FIG. 5 is a block diagram of the protocol converter according to one embodiment of the present disclosure.

Reference is made to FIG. 5, which is a block diagram depicting a circuit system of the protocol converter according to one embodiment of the present disclosure.

A protocol converter 50 that is connected with a sink device 53 of a multimedia system is provided. After the protocol converter 50 receives first format audiovisual signals 51, the first format audiovisual signals 51 are converted and outputted to the sink device 53. The protocol converter 50 includes an audiovisual receiver 501 that divides the audiovisual data into a video portion and an audio portion. The video portion is transmitted to a video processor 503 for performing a decoding and encoding process according to a video format. For example, the video processor 503 converts the first format audiovisual data into HDMI format data supported by the multimedia system, and an audiovisual transmitter 505 outputs the HDMI format data to the sink device 53. An audio protocol processing unit 500 is incorporated to the protocol converter 50. The audio protocol processing unit 500 receives the audio portion of the audiovisual data from an audiovisual receiver 501. The audio protocol processing unit 500 then decodes or encodes the audio portion and converts the signals into audio signals of a specific format. The protocol converter 50 outputs the audio signals to an audio output device connected with the protocol converter 50. The audio output device is such an audio system 55.

The protocol converter 50 also outputs the audio signals to the sink device 53 through the audiovisual transmitter 505. The audiovisual transmitter 505 is a connection interface between the protocol converter 50 and the sink device 53. For example, the connection interface can be an HDMI format interface.

More particularly, the protocol converter 50 is able to receive audio signals returned from the sink device 53 via an audio return channel 511 that can be an audio return channel (ARC) or an enhanced audio return channel (eARC). The audio signals are transmitted to the audio protocol processing unit 500 via an audio return receiving circuit 507. The audio signals are converted into audio signals of a specific format and then outputted to the audio system 55. Audio signals of multiple channels can be outputted to different speakers so as to achieve the sound having multiple depths and stereo surround effect.

Figure 6:
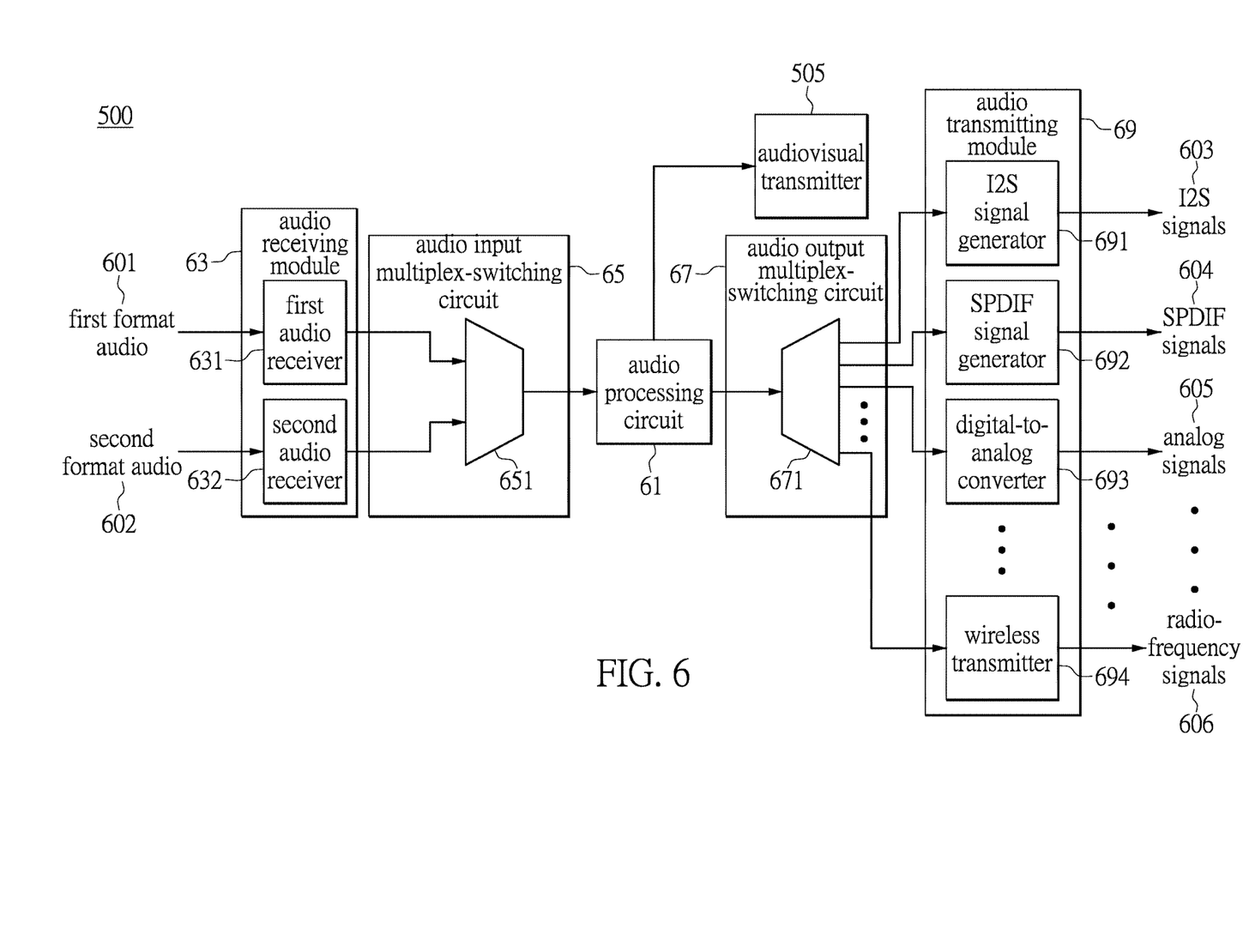
FIG. 6 is a block diagram depicting an audio protocol converting circuit of the protocol converter according to one embodiment of the present disclosure.

The protocol converter 50 processes the audio signals by using the audio protocol processing unit 500. Reference is made to FIG. 6, which is a block diagram depicting the audio protocol processing unit 500 according to one embodiment of the present disclosure. The audio protocol processing unit 500 can be firmware or software that is performed in the circuitry of the protocol converter 50. The audio protocol processing unit 500 can also be an audio protocol converting circuit. The audio protocol processing unit 500 shown in the diagram includes an audio processing circuit 61 that is used to process audio signals inputted to the protocol converter for generating output audio signals. For example, the audio processing circuit 61 processes the first format audio 601 from a first format audiovisual source, or the second format audio 602 returned from the sink device of the multimedia system. The audio processing circuit 61 includes four portions of circuits that have functions as described below.

A first portion of the multimedia system includes an audio receiving module 63 and an audio transmitting module 69 shown in the diagram. The audio receiving module 63 of the audio protocol processing unit 500 is used to process two audio signals of different formats respectively, i.e., a first audio receiver 631 and a second audio receiver 632 are used to receive audio signals of different formats. For example, the main task of the first audio receiver 631 and the second audio receiver 632 is to receive the first format audio 601 (e.g., DP/Type-C audio) and the second format audio 602 (e.g., the audio packets of HDMI eARC/ARC returned from the sink device). The audio receiving module 63 decodes audio packets of the first format audio 601 and the second format audio 602 that are respectively received by the first audio receiver 631 and the second audio receiver 632 and retrieves audio sample data and audio information from the audio signals. The audio information is such as a sampling rate, number of audio channels and a coding format. The audio receiving module 63 then switches to an audio transmission interface and outputs audio signals via the audio transmitting module 69.

On the other hand, the second audio receiver 632 of the audio receiving module 63 receives the second format audio 602 returned from the sink device of the multimedia system via an audio return channel or an enhanced audio return channel. When the audio signals are processed by the second audio receiver 632, a discovery and disconnect process is firstly performed. According to one of the embodiments of the present disclosure, the audio receiving module 63 discovers that the sink device (i.e., HDMI Sink) supports the enhanced audio return channel (eARC), and the audio receiving module 63 is switched to the enhanced audio return channel mode. The second audio receiver 632 is capable of receiving the uncompressed audio data (e.g., 8-channel 24-bit linear pulse-code modulation (L-PCM) audio data at 192 KHz sampling rate) having a bandwidth of 36.864 Mbps via the enhanced audio return channel (eARC). If the audio receiving module 63 discovers that the sink device does not support the enhanced audio return channel (eARC), the audio receiving module 63 is downgraded to a normal audio return channel mode. Under this mode, the second audio receiver 632 can only receive the uncompressed audio data (e.g., 2-channel 24-bit L-PCM at 192 KHz sampling rate) having a bandwidth of 9.216 Mbps. Whether the protocol converter is under the audio return channel mode or the enhanced audio return channel mode, the audio receiving module 63 retrieves the audio sampling data and relevant information for use by the audio transmitting module 69 as processing the first format audio 601.

In the present embodiment as shown in the figures, the audio transmitting module 69 includes an $I^2S$ signal generator 691 for outputting $I^2S$ signals 603, an SPDIF signal generator 692 for outputting SPDIF signals 604, a digital-to-analog converter 693 for converting digital signals into analog signals and outputting analog signals 605, and a wireless transmitter 694 for outputting radio-frequency signals 606. Each of the different output signals corresponds to an audio output device.

A second portion of the multimedia system includes a multiplex-switching module for inputting and outputting audio. The multiplex-switching module includes an audio input multiplex-switching circuit 65 and an audio output multiplex-switching circuit 67. The protocol converter can freely switch to any of different audio input sources and any of audio output interfaces by multiplexers 651 and 671. Further, in addition to switching the transmission lines for audio signals, the protocol converter can provide functions of powering on and off, and clock frequency switching.

In the present embodiment, the audio input multiplex-switching circuit 65 can be used to switch an input line automatically or manually according to an audio source. The audio input multiplex-switching circuit 65 can determine whether to generate a control signal automatically or generate the control signal manually for switching to receive the first format audio 601 or the second format audio 602 outputted by a first audio receiver 631 or a second audio receiver 632. Accordingly, audio signals of different formats can be inputted to the audio processing circuit 61 via the multiplexer 651 of the audio input multiplex-switching circuit 65. The protocol converter includes at least one audio output interface. When the audio processing circuit 61 decodes the first format audio or the second format audio according to an output requirement, the multiplexer 671 relies on the control signal received by the audio output multiplex-switching circuit 67 to switch an output line for deciding one of the audio output interfaces. The audio output multiplex-switching circuit 67 is electrically connected with various signal generators in the audio transmitting module 69 and the various signal generators correspond to various types of audio output interfaces. As the exemplary example shows, the audio output interface can be a digital interface for any one of audio formats, such as $I^2S$ and SPDIF. The audio output interface can also be an analog interface of the analog signals that are converted from digital signals. The analog interface is such as an output interface of an earphone or a speaker system. The analog interface can also be converted to a radio-frequency interface that is such as an interface for Bluetooth communication or a wireless network. It should be noted that the transmission interface of the protocol converter for inputting and outputting audio is not limited to the above-mentioned formats. The protocol converter can flexibly switch to any of the audio transmission interfaces since the transmission interface of the protocol converter can be switched to any interface for outputting the audio signals to any of the signal generators. Alternatively, the transmission interface and other interface can output the audio signals of various audio formats to the signal generators simultaneously.

A third portion of the multimedia system is an audio processing circuit 61 that can be implemented by means of software, firmware or hardware. The audio processing circuit 61 is a core of the audio protocol processing unit 500. One of the objectives of the audio processing circuit 61 is to perform decoding, encoding or various post-processing manners on the audio signals. According to one embodiment of the present disclosure, the audio processing circuit 61 can compress L-PCM coding format audio signals to AC3, MPEG, DTS or Dolby format audio signals. The audio processing circuit 61 can also decompress the compressed audio signals to L-PCM format audio signals. The audio processing circuit 61 can further process the digital audio signals by many post-processing manners such as noise cancellation, volume control, audio pop suppression, and tone adjustment by an equalizer. After that, the audio signals are then sampled and packaged to be in compliance with a target transmission interface format. The audio signals are then outputted by the circuits of the transmission interfaces, or to the sink device 53 as shown in FIG. 5 by the audiovisual transmitter 505. In the multimedia system that supports both HDMI CEC and DP Aux-to-CEC technologies, the audio processing circuit 61 also process control signals under the CEC protocol.

A fourth portion of the multimedia system is software or firmware for system action integration. The circuits and modules of the audio protocol processing unit 500 are controlled according to different multimedia application circumstances such as a theater mode, a sports mode and a vocal mode. The audio protocol processing unit 500 is used to integrate and manage operations of software, firmware and circuits of the protocol converter and actions such as decision, arbitration and interruption processing. The protocol converter embodies a complete and comprehensive multimedia interface and conversion device for images and audios.

In one embodiment of the present disclosure, the software or firmware of the protocol converter can be implemented by a memory and a processor such as the audio processing circuit 61. Programs are stored in the memory and the processor executes the programs for driving a system of the protocol converter. The above-mentioned modules of the protocol converter implement control logics, parameter settings, arbitration judgment, power management, interruption processing and time scheduling.

In summation, according to the above embodiments of the multimedia system, the protocol converter is introduced to enhance flexibility of audio conversion so as to improve audio processing capability. The protocol converter can be integrated into HDMI-CEC and DP AUX-to-CEC in a multimedia system. In addition to the original functions of the protocol conversion in the system, the protocol converter can be connected with all of the devices in the multimedia system through HDMI-CEC. The multimedia system can maintain its compatibility when the processing capability and the application flexibility of the protocol converter are enhanced. Finally, the protocol converter achieves a comprehensive solution for the multimedia system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A protocol converter, comprising:
    an audiovisual receiver receiving an audiovisual data, wherein a video portion is transmitted to a video processor for performing a decoding/encoding process according to a video format;
    an audio return receiving circuit directly connected to a sink device;
    an audio protocol processing unit connected to the audiovisual receiver and the audio return receiving circuit, wherein the audio protocol processing unit configured to:
    in response to receiving an audio portion of the audiovisual data from the audiovisual receiver, perform audio processing and convert the audio portion to an audio format; and
    in response to receiving audio signals from the sink device via the audio return receiving circuit, process the audio signals and output the processed audio signals to an audio output device connected with the protocol converter, wherein the audio portion is a first format audio, and the audio signals received from the sink device are a second format audio;
    an audiovisual transmitter outputting a video and an audio that are processed to the sink device; and
    at least one audio output interface;
    wherein the audio protocol processing unit includes:
    an audio receiving module including a first audio receiver and a second audio receiver that are respectively used to process the first format audio and the second format audio;
    an audio input multiplex-switching circuit switches the protocol converter to an input line for receiving the first format audio or the second format audio;
    an audio processing circuit configured to perform encoding and decoding on the audio signals, and to process control signals in compliance with consumer electronics control (CEC), wherein the first format audio or the second format audio is input to the audio processing circuit;
    an audio output multiplex-switching circuit configured to switch an output line in response to the audio processing circuit configured to perform encoding and decoding on the first format audio or the second format audio, so as to decide upon one of the at least one audio output interface; and
    an audio transmitting module having a plurality of signal generators electrically connected with the audio output multiplex-switching circuit, wherein the signal generators correspond to the at least one audio output interface.

2. The protocol converter according to claim 1, wherein the protocol converter receives the audio signals from the sink device via an audio return channel or an enhanced audio return channel.

3. The protocol converter according to claim 1, wherein the first format audio is converted and outputted to the sink device after a conversion.

4. The protocol converter according to claim 1, wherein the audio receiving module decodes audio packets of the first format audio and the second format audio that are respectively received by the first audio receiver and the second audio receiver and retrieves audio sample data and audio information from the audio signals, wherein the audio information includes a sampling rate, number of audio channels and a coding format, and the audio signals are outputted via the audio transmitting module when switching to an audio transmission interface.

5. The protocol converter according to claim 1, wherein the second audio receiver receives the second format audio returned from the sink device via an audio return channel or an enhanced audio return channel, and performs a discovery and disconnect process for discovering whether or not the sink device supports the enhanced audio return channel.

6. The protocol converter according to claim 1, wherein the audio output interface is one or more of an analog interface, a digital interface, or a radio-frequency interface.

7. A multimedia system, comprising:
    a sink device; and
    a protocol converter connected with the sink device, wherein the protocol converter includes:
    an audiovisual receiver receiving audiovisual data, wherein a video portion of the audiovisual data is transmitted to a video processor that performs encoding and decoding upon the video portion that conforms to a video format;
    an audio return receiving circuit directly connected to the sink device;
    an audio protocol processing unit connected to the audiovisual receiver and the audio return receiving circuit, wherein the audio protocol processing unit configured to:

in response to receiving an audio portion of the audiovisual data from the audiovisual receiver, perform audio processing and convert the audio portion to an audio format; and in response to receiving audio signals from the sink device via the audio return receiving circuit, process the audio signals and output the processed audio signals to an audio output device connected with the protocol converter, wherein the audio portion is a first format audio, and the audio signals received from the sink device are a second format audio;

an audiovisual transmitter, after the video portion and the audio portion are processed, outputting the video portion and the audio portion to the sink device; and at least one audio output interface;

wherein the audio protocol processing unit includes:
    an audio receiving module including a first audio receiver and a second audio receiver that are respectively used to process the first format audio and the second format audio;
    an audio input multiplex-switching circuit switches the protocol converter to an input line for receiving the first format audio or the second format audio;
    an audio processing circuit configured to perform encoding and decoding on the audio signals, and to process control signals in compliance with consumer electronics control (CEC), wherein the first format audio or the second format audio is input to the audio processing circuit;
    an audio output multiplex-switching circuit configured to switch an output line in response to the audio processing circuit configured to perform encoding and decoding on the first format audio or the second format audio, so as to decide upon one of the at least one audio output interface; and
    an audio transmitting module having a plurality of signal generators electrically connected with the audio output multiplex-switching circuit, wherein the signal generators correspond to the at least one audio output interface.

8. The multimedia system according to claim 7, wherein the protocol converter receives the audio signals from the sink device via an audio return channel or an enhanced audio return channel.

9. The multimedia system according to claim 7, wherein the sink device connects with one or more audiovisual devices that are one or more sources of the audiovisual data for the sink device, and form the audio signals being outputted from the sink device to the protocol converter.

10. The multimedia system according to claim 7, wherein the first format audio is converted and outputted to the sink device after a conversion.

11. The multimedia system according to claim 7, wherein the audio output interface is an analog interface, a digital interface or a radio-frequency interface.

* * * * *